United States Patent
Christensen (10) Patent No.: US 6,360,480 B1
(45) Date of Patent: Mar. 26, 2002

(54) METHOD AND SYSTEM TO FACILITATE DEEP PHYTOREMEDIATION

(76) Inventor: Alan J. Christensen, 882 N. 400 East, American Fork, UT (US) 84003

( * ) Notice: Subject to any disclaimer, the term of this patent is extended or adjusted under 35 U.S.C. 154(b) by 0 days.

(21) Appl. No.: 09/282,012

(22) Filed: Mar. 29, 1999

Related U.S. Application Data (60) Provisional application No. 60/079,978, filed on Mar. 30, 1998.

(51) Int. Cl.[7] .......................... A01B 79/02; A01G 29/00
(52) U.S. Cl. ......................................... 47/58.1; 47/48.5
(58) Field of Search ................... 47/58.1, 48.5, 47/1.01 F; 111/100, 101

(56) References Cited

U.S. PATENT DOCUMENTS

| | | | |
|---|---|---|---|
| 535,887 A | * 3/1895 | Brown | 111/101 X |
| 2,127,175 A | * 8/1938 | Imbertson et al. | |
| 2,850,843 A | * 9/1958 | Mar Bury | 47/48.5 |
| 3,057,116 A | * 10/1962 | Szochet | 47/58.1 |
| 3,109,258 A | * 11/1963 | Jensen | |
| 3,757,469 A | * 9/1973 | Smith et al. | 47/48.5 |
| 3,990,181 A | * 11/1976 | Do Valle | 47/1.01 F |
| 4,287,840 A | * 9/1981 | Weidner | 111/101 |
| 4,726,143 A | * 2/1988 | Stenbeck | 47/48.5 |
| 4,920,694 A | * 5/1990 | Higa | 47/48.5 |
| 5,156,101 A | * 10/1992 | Wien | 111/101 |
| 5,533,300 A | * 7/1996 | Kesler | 47/48.5 |
| 5,829,191 A | * 11/1998 | Gatliff | 47/58.1 |

FOREIGN PATENT DOCUMENTS

| | | | | |
|---|---|---|---|---|
| DE | 3441098 | * | 5/1986 | .......... A01G/29/00 |
| JP | 05137460 A | * | 6/1993 | |
| JP | 8051877 | * | 2/1996 | .......... A01G/29/00 |
| JP | 09275784 A | * | 10/1997 | |

* cited by examiner

Primary Examiner—Peter M. Poon
Assistant Examiner—Son T. Nguyen
(74) Attorney, Agent, or Firm—Thompson E. Fehr (57) ABSTRACT

A method and system to facilitate deep phytoremediation by planting a tree deeper than is traditionally done and then supplying at such depths the air; water; nutrients; and, optionally, the gaseous exchange needed for the development of root systems. Either forced air or the germination and growth of mycorrhizae spores not creates, in compacted soil, macro pores through which root hair can pass. The trunk of the tree can optionally be coated with either vitamin B1 or mycorrhizae spores or a combination of these substances to encourage root growth even further. To prevent water from flowing to the bottom of the hole in which the tree has been planted and air from flowing to the top of such hole, clay layers are optionally used to separate different areas where root growth is desired. Conversely, to preclude root growth in areas where such growth is not desired, either the trunk of the tree is wrapped, in such areas, with a material that is impervious to roots or such areas are backfilled with gravel.

18 Claims, 6 Drawing Sheets

METHOD AND SYSTEM TO FACILITATE DEEP PHYTOREMEDIATION

CROSS-REFERENCE TO RELATED APPLICATION

This is a continuation of copending U.S. provisional application Ser. No. 60/079,978, filed on Mar. 30, 1998.

BACKGROUND OF THE INVENTION

1. Field of the Invention

This invention relates to a method and system to facilitate phytoremediation, especially to permit phytoremediation to be conducted at depths beyond those traditionally employed.

2. Description of the Related Art

U.S. Pat. No. 5,829,192 utilizes a tree in order to have its root system aid in the remediation of contaminated soil and groundwater, which constitutes phytoremediation.

The only step in the process of that patent which differs from the normal planting of a tree is, however, is "providing a casing made of material which is impervious to water and nutrients for root growth, and lining the walls of the hole [in which the tree is planted] with such casing . . . "

The purpose of the casing is stated to be "so that root growth is inhibited from growing outside of the prepared hole."

However, no provision is made to encourage root growth below the depth at which roots are normally produced.

Phillip Craul wrote in *Urban Soil in Landscape Design* (1992) that "[m]ost roots occur within the surface 3 ft. (1 m) of . . . soils . . . as the result of . . . proximity of favorable root growth conditions . . . "

But the critical need for rooting at depths below 3 feet for trees employed in phytoremediation is evident from the facts that contaminants often exist or extend below such depth and that the greatest potential for contamination of drinking water occurs at lower depths.

Previous attempts to encourage deep rooting have mistakenly only considered the need of trees for nutrients and water.

SUMMARY OF THE INVENTION

The present invention, however, recognizes that favorable growth of root systems requires aeration, gaseous exchange, and decreased soil compaction in addition to nutrients and water.

Besides providing the preceding, the present invention has appreciated the fact that the germination and growth of mycorrhizae spores not only creates macro pores through which root hair can pass, but the fungus resulting from such germination and growth also creates a pathway for nutrients to reach the root hair.

Furthermore, the present invention optionally directs forced air to deep areas where it is desired to establish root systems. Such forced air also opens macro pores in soil.

Additionally, to encourage root growth in desired areas, the trunk can be coated in those areas with either vitamin B1 or mycorrhizae spores or a combination of these substances. And in order to create optimal growing conditions in areas at various elevations along the trunk, these areas can be separated by horizontal clay layers. The clay layers preclude oxygen from drifting to the top of the hole in which the tree has been planted and preclude water nutrients from flowing to the bottom of the hole. (Of course, air, nutrients, and water will be supplied to each region between clay layers.)

Similarly, to prevent growth in specific areas, either (a) the trunk can be wrapped with epdm rubber or a biobarrier or (b) the region around the trunk in such areas can be backfilled with gravel so that it will contain no nutrients or water together with an overabundance of air or (c) both techniques can be implemented.

The preceding technologies enable the hole where the tree is planted to be deeper than previously possible and, therefore, enable the tree to perform phytoremediation much farther below grade than has been achieved prior to development of the present invention.

DESCRIPTION OF THE PREFERRED EMBODIMENT

In order to enable a tree to be planted lower than traditional depths and, therefore, to enable the root system of such a tree to perform phytoremediation at such depths, the present invention provides water; air; nutrients; and, optionally, gaseous exchange at the depths where it is desired to establish root systems.

A hole 1 is established, for example by excavating or drilling, beyond traditional depths for planting a tree 2. A tree 2 is then placed in the hole 1, and backfill material 3 is inserted around the tree 2 in the hole 1.

Figure 1:
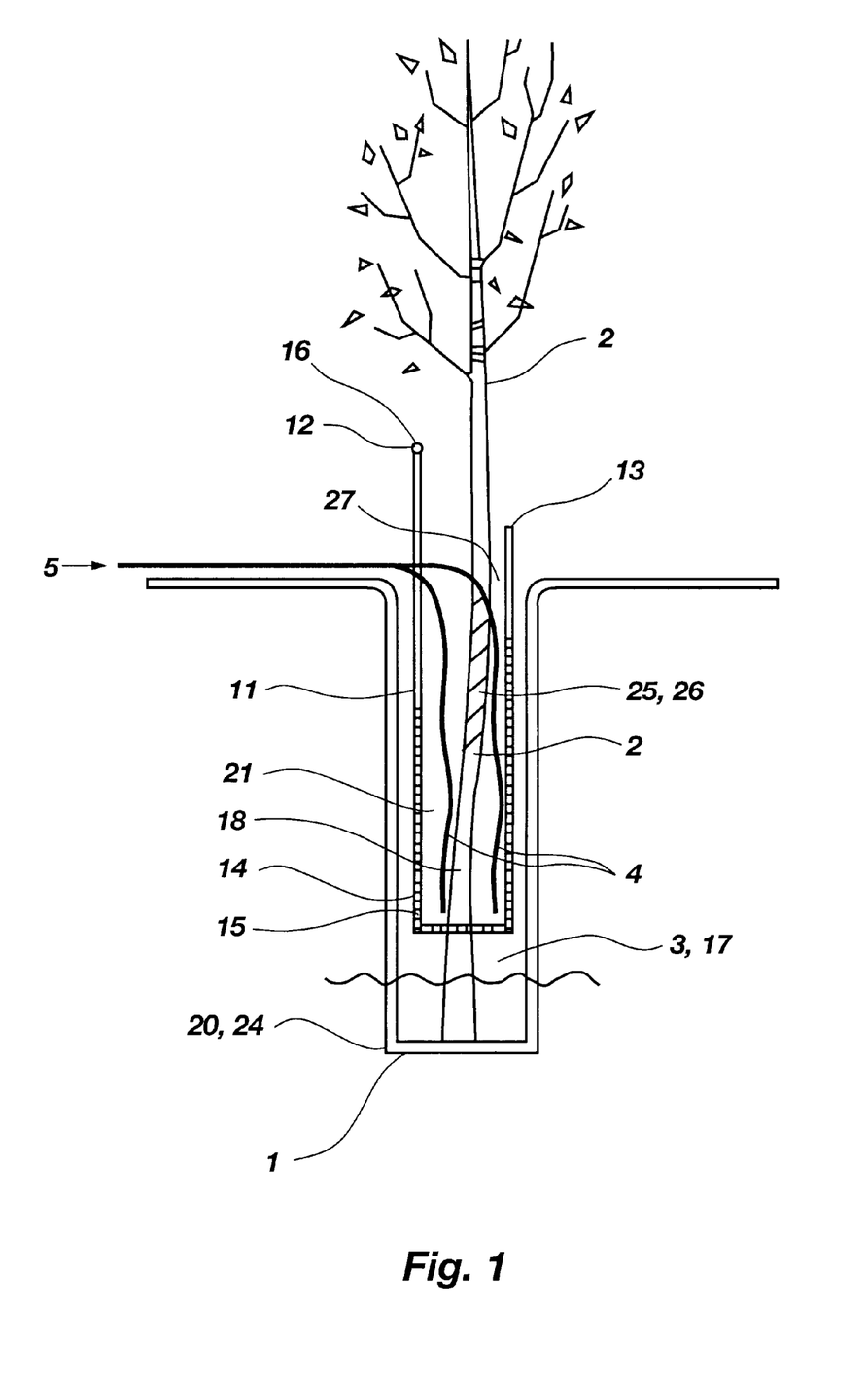
FIG. 1 depicts the basic system for facilitating deep phytoremediation.

As illustrated in FIG. 1, a tube 4, preferably a drip irrigation tube, transports water 5 from a source of water 6 to the locations where it is desired to provide water 5. The tube 4 has apertures 7 or, preferably, pressure-compensating emitters at locations where it is desired to provide water 5. Using any technique that is well known in the art, such as fertilizer injectors (e.g., the E-Z Grow No. 40010HF010C Automatic Fertilizer System manufactured by the E-Z Grow Company or the Dosmatic Model No. DP30-2 Fertilizer Injector made by the Dosmatic Company) nutrients are added to the water 5 prior to such water 5 entering the tube 4.

Several options exist for aeration and gaseous exchange.

Figure 5A:
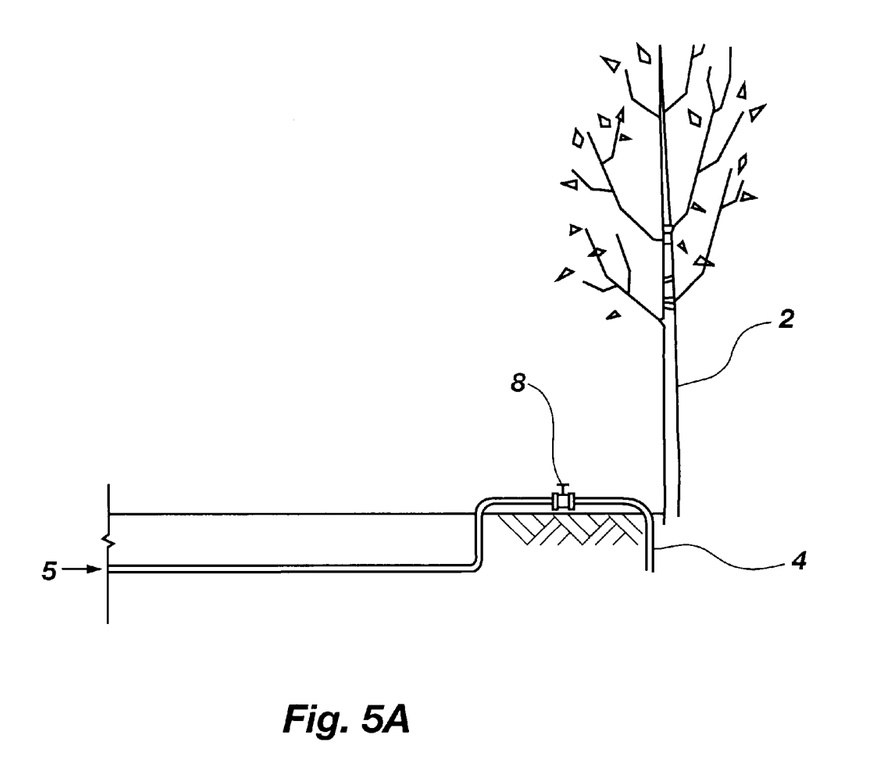
FIG. 5A is a lateral view of a drip irrigation tube employing a valve or drain.
Figure 5B:
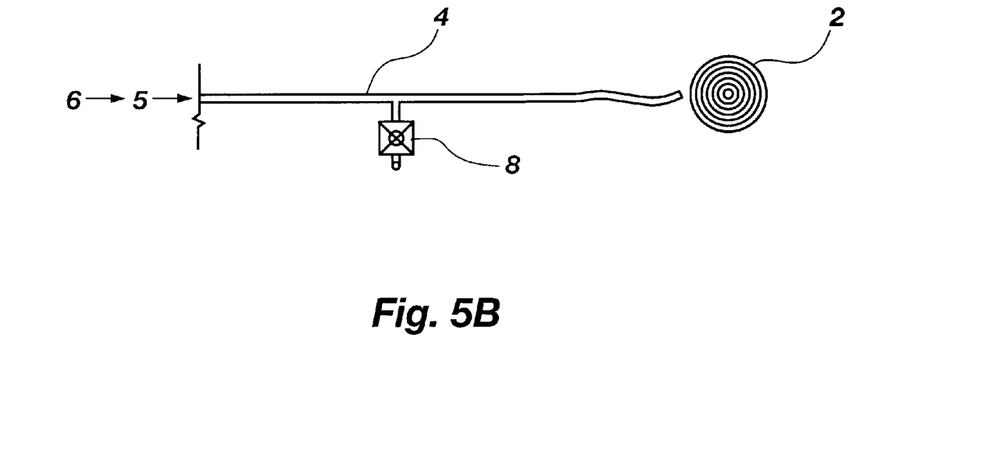
FIG. 5B is an overhead view of a drip irrigation tube employing a valve or drain.

First, passive aeration and gaseous exchange may be achieved by installing in the tube 4 above ground a valve or drain 8. The drain is constructed so that it is open to the atmosphere when no water 5 is in the tube 4 and is automatically closed when water 5 is in the tube 4; such drains are well known in the irrigation industry. The valve is opened manually or electrically; the electrical opening can be controlled by a timer. When the valve or drain 8 is open, air can then flow down and pass outward from the apertures or emitters 7; and other gases can flow into the apertures or emitters 7 and proceed to the valve or drain 8 and into the atmosphere.

Figure 4A:
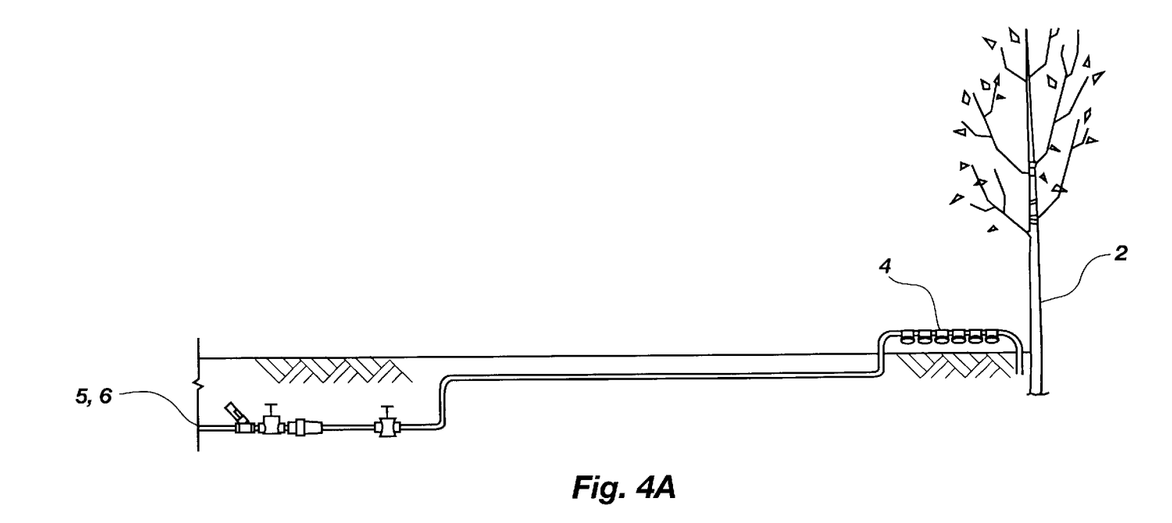
FIG. 4A is a lateral view of a drip irrigation tube.
Figure 4B:
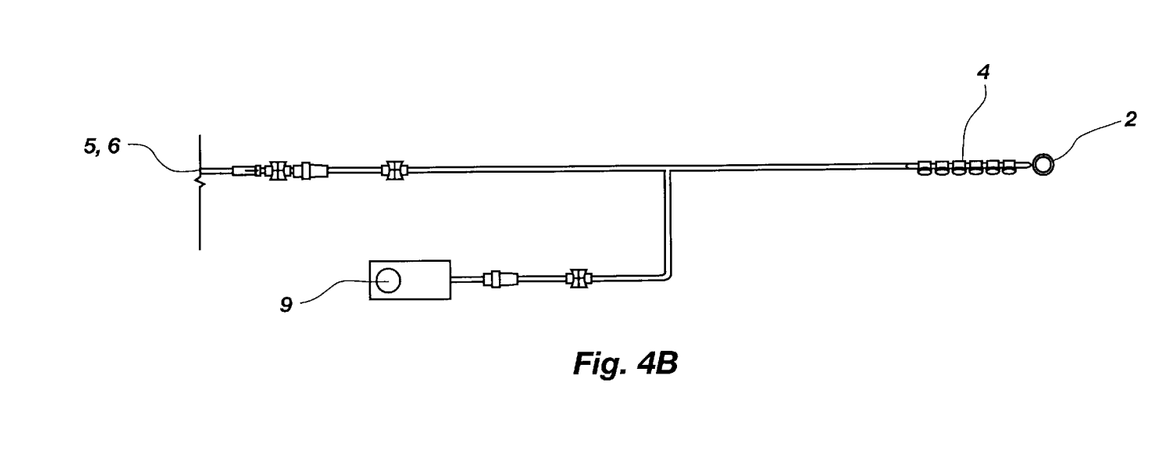
FIG. 4B shows an air compressor connected to the drip irrigation tube.

Second, active aeration may be achieved by connecting an air compressor 9 to the tube when it is not desired to supply water 5. Although gases could not flow into the apertures or emitters 7 during active aeration, forced air leaving the apertures or emitters 7 also opens macro pores in soil, as discussed above, thereby creating spaces termed "macro pores" which root hairs can penetrate and which facilitate aeration.

But, whether, active or passive aeration is desired, a separate tube 10 can be provided for the air if it is not desired to have a dual purpose for tube 4.

And, third, a U-shaped tube 11 having both its first end 12 and its second end 13 open can be installed with both ends 12, 13 above ground and with some of the intermediate portion 14 between the ends 12, 13 below ground and in the vicinity of the tree 2. In the areas where it is desired to establish root systems, the U-shaped tube 11 contains apertures 15 to permit air to flow from such apertures 15 into the surrounding backfill material 3 and to permit other gases to flow into such apertures 15 from the backfill material 3, thereby providing gaseous exchange as well as aeration.

Optionally, flow through the U-shaped tube 11 can be augmented by placing an attic circulation vent 16, i.e., the type of vent which rotates in the wind and thereby draws air into the U-shaped tube 11, on the first end 12 of the U-shaped tube 11.

And a preferred option to enhance root growth and to facilitate the absorption of nutrients by the root systems is adding mycorrhizae spores 17 to the backfill material 3. As explained above, the germination and growth of mycorrhizae spores 17 not only creates macro pores through which root hair can pass, but the fungus resulting from such germination and growth also creates a pathway for nutrients to reach the root hair. Moreover, aeration of the backfill material 3 enhances the growth of the mycorrhizae spores 17.

Additionally, as discussed above, to encourage root growth in desired areas, the trunk 18 of the tree 2 preferably coated in those areas with either vitamin B1 or mycorrhizae spores 17 or a combination of vitamin B1 and mycorrhizae spores 17.

Figure 2:
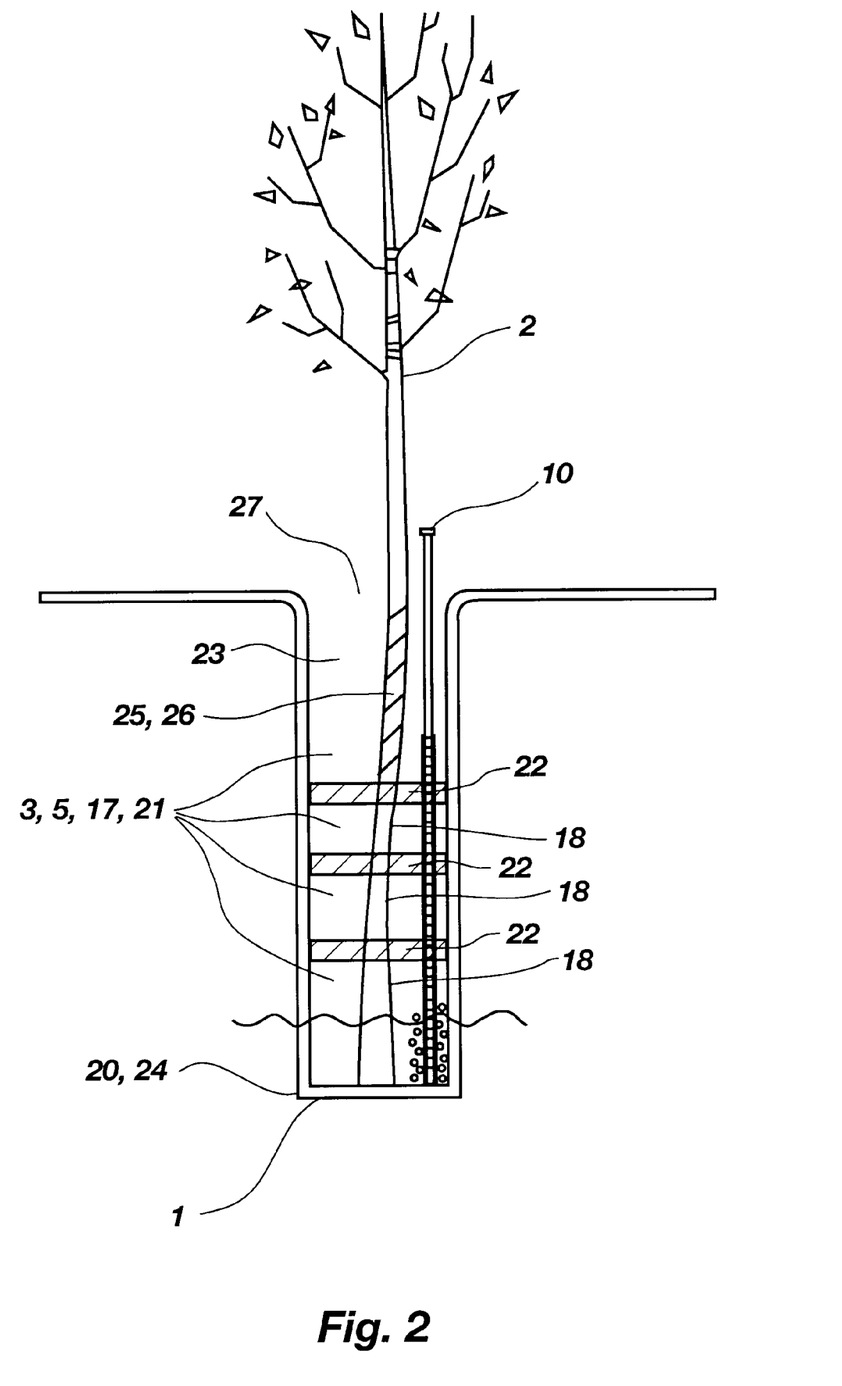
FIG. 2 shows the trunk of a tree wrapped with material that is impermeable to roots in order to preclude the growth of roots where such roots are not desired within the hole in which the tree has been planted for photoremediation and also demonstrates the use of clay layers.

Also preferably and as portrayed in FIG. 2, to enhance root growth even further, a malleable, porous material such as a sponge 19 is placed around the apertures or, preferably, pressure-compensating emitters 7 of the tube 4 and attached to the trunk 18 of the tree 2. The sponge 19 aids in retaining and dispersing air as well as water 5 and, consequently, nutrients in the areas where it is desired to establish root growth. Moreover, the sponge 19 minimizes the possibility that the apertures or, preferably, pressure-compensating emitters 7 may become clogged and aids in gaseous exchange by increasing the volume available for the gathering of gases.

And one final technique is preferably employed in order to create optimal growing conditions for roots in areas at various elevations along the trunk 18.

Figure 6A:
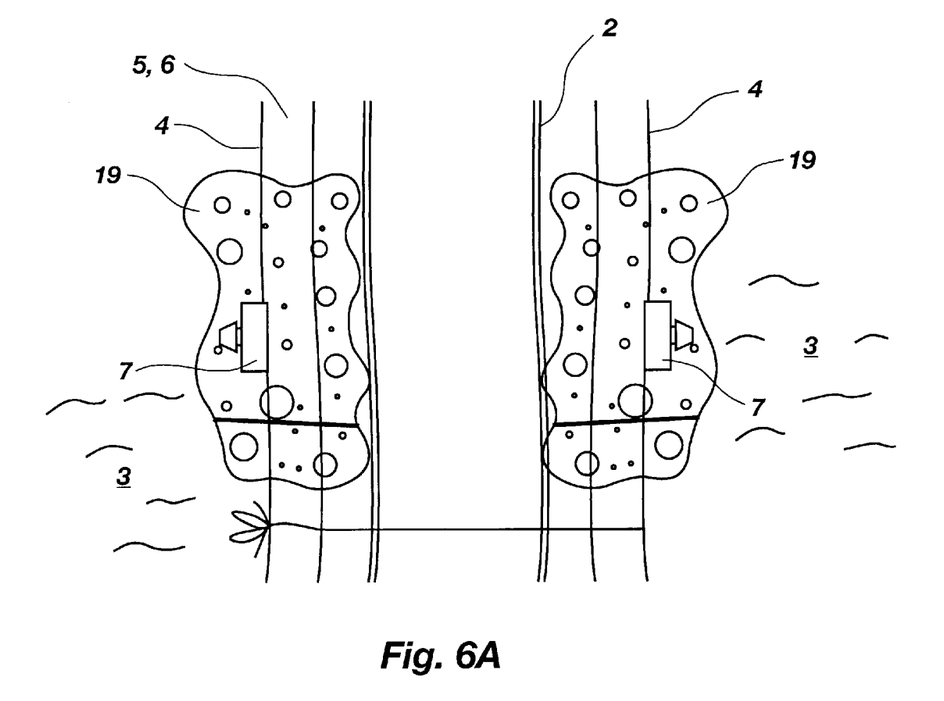
FIG. 6A illustrates the use of malleable, porous material such as a sponge, around the apertures or, preferably, pressure-compensating emitters of the tube that supplies air and water, attached to the trunk of a tree to encourage root growth.
Figure 6B:
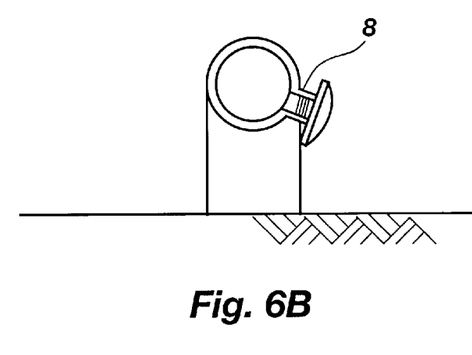
FIG. 6B portrays a drain.

Also preferably and as portrayed in FIG. 6A, to enhance root growth even further, a malleable, porous material such as a sponge 19 is placed around the apertures or, preferably, pressure-compensating emitters 7 of the tube 4 and attached to the trunk 18 of the tree 2. The sponge 19 aids in retaining and dispersing air as well as water 5 and, consequently, nutrients in the area where it is desired to establish root growth. Moreover, the sponge 19 minimizes the possiblity that the apertures or, preferably, pressure-compensating emitters 7 may become clogged and aids in gaseous exchange by increasing the volume available for the gathering of gases.

To retain all the elements essential for enhanced root growth within selected areas 21 where such growth is desired at various elevations along the trunk 18 clay layers 22 are inserted above all such selected areas 21 except, optionally, for the uppermost such selected area 23 and below all such selected areas except for the lowest such selected area 24. Of course, within each such selected area 21, there must be the means discussed above for aeration, gaseous exchange, and the supply of water and nutrients.

Conversely to the primary emphasis of the preceding discussion, there can be areas 25 around the trunk 18 in the hole 1 where root growth is not desired.

Figure 3:
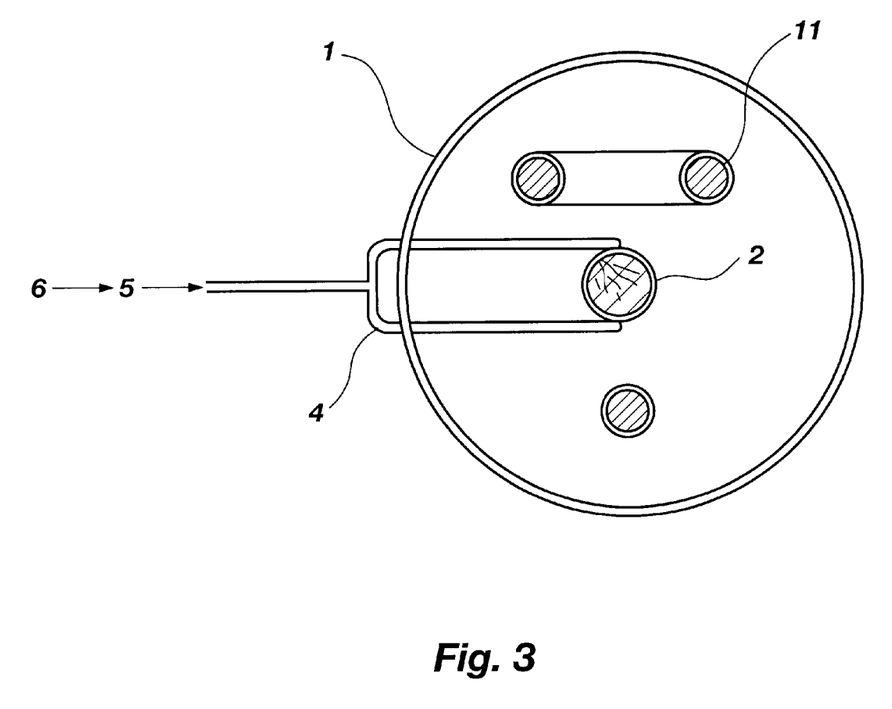
FIG. 3 is a cross-sectional view from above of the basic system for facilitating deep photoremediation.

Two techniques are employed to preclude root growth. In the first technique, the trunk 18 is wrapped, as illustrated in FIG. 3, with material that is impermeable to roots 26, such as epdm rubber or a biobarrier. The second technique comprises, as illustrated in FIG. 4, placing gravel, preferably gravel having a diameter of approximately 1.5 inches, as the backfill material 3 in the areas 25 so that the water 5 and, consequently, the nutrients will drain from such areas 25 and so that such areas 25 will have an overabundance of air to the extent that such density of air actually deters the growth of roots. Of course, if desired, these two techniques can be employed concurrently.

I claim:

1. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

providing gaseous exchange at the depths where it is desired to establish root systems;

creating macro pores at the depths where it is desired to establish root systems;

in those areas where it is desired to encourage root growth, coating the trunk of the tree with one or more root-growth-enhancing substances selected from the group consisting of vitamin B1 and mycorrhizae spores; and inserting clay layers above each selected area where root growth is desired and below each selected area where root growth is desired except for the lowest such selected area.

2. The method to facilitate deep phytoremediation as recited in claim 1, wherein:

the micro pores are created by adding mycorrhizae spores to the backfill material.

3. The method to facilitate deep phytoremediation as recited in claim 1, further comprising:

precluding root growth in areas where root growth is not desired.

4. The method to facilitate deep phytoremediation as recited in claim 3, wherein:

the micro pores are created by adding mycorrhizae spores to the backfill material; and root growth is precluded in areas where root growth is not desired by wrapping the trunk of the tree in such areas with material that is impermeable to roots.

5. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

providing gaseous exchange at the depths where it is desired to establish root systems;

creating macro pores at the depths where it is desired to establish root systems; and inserting clay layers above each selected area where root growth is desired and below each selected area where root growth is desired except for the lowest such selected area.

6. The method to facilitate deep phytoremediation as recited in claim 5, further comprising:

precluding root growth in areas where root growth is not desired.

7. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

providing gaseous exchange at the depths where it is desired to establish root systems; and in those areas where it is desired to encourage root growth, coating the trunk of the tree with one or more root-growth-enhancing substances selected from the group consisting of vitamin B1 and mycorrhizae spores; and inserting clay layers above each selected area where root growth is desired and below each selected area where root growth is desired except for the lowest such selected area.

8. The method to facilitate deep phytoremediation as recited in claim 7, further comprising:

recluding root growth in areas where root growth is not desired.

9. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

providing gaseous exchange at the depths where it is desired to establish root systems; and inserting clay layers above each selected area where root growth is desired and below each selected area where root growth is desired except for the lowest such selected area.

10. The method to facilitate deep phytoremediation as recited in claim 9, further comprising:

precluding root growth in areas where root growth is not desired.

11. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

creating macro pores at the depths where it is desired to establish root systems;

in those areas where it is desired to encourage root growth, coating the trunk of the tree with one or more root-growth-enhancing substances selected from the group consisting of vitamin B1 and mycorrhizae spores; and inserting clay layers above each selected area where root growth is desired and below each selected area where root growth is desired except for the lowest such selected area.

12. The method to facilitate deep phytoremediation as recited in claim 11, further comprising:

precluding root growth in areas where root growth is not desired.

13. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

creating macro pores at the depths where it is desired to establish root systems; and inserting clay layers above each selected area where root growth is desired and below each selected area where root growth is desired except for the lowest such selected area.

14. The method to facilitate deep phytoremediation as recited in claim 13, further comprising:

precluding root growth in areas where root growth is not desired.

15. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems;

in those areas where it is desired to encourage root growth, coating the trunk of the tree with one or more root-growth-enhancing substances selected from the group consisting of vitamin B1 and mycorrhizae spores; and inserting clay layers above each selected area where root growth is desired and below each selected area where root growth is desired except for the lowest such selected area.

16. The method to facilitate deep phytoremediation as recited in claim 15, further comprising:

precluding root growth in areas where root growth is not desired.

17. A method to facilitate deep phytoremediation, which comprises:

establishing a hole beyond traditional depths for planting a tree;

placing a tree in said hole;

inserting backfill material around the tree in said hole;

providing air at the depths where it is desired to establish root systems;

providing water at the depths where it is desired to establish root systems;

providing nutrients at the depths where it is desired to establish root systems; and inserting clay layers above each selected area where root growth is desired and below each selected area where root growth is desired except for the lowest such selected area.

18. The method to facilitate deep phytoremediation as recited in claim 17, further comprising:

precluding root growth in areas where root growth is not desired.

* * * * *